United States Patent
Pereira et al.

(10) Patent No.: US 11,722,599 B2
(45) Date of Patent: Aug. 8, 2023

(54) CALL CONTROL INSTANCE CHANGEOVER

(71) Applicant: Intermedia.net, Inc., Sunnyvale, CA (US)

(72) Inventors: Vladimir Pereira, Sunnyvale, CA (US); Javier Ruiz Sierra, Sunnyvale, CA (US)

(73) Assignee: Intermedia.net, Inc., Sunnyvale, CA (US)

( * ) Notice: Subject to any disclaimer, the term of this patent is extended or adjusted under 35 U.S.C. 154(b) by 27 days.

(21) Appl. No.: 17/514,385

(22) Filed: Oct. 29, 2021

(65) Prior Publication Data

US 2023/0136859 A1    May 4, 2023

(51) Int. Cl.
*H04M 3/50* (2006.01)
(52) U.S. Cl.
CPC ........ *H04M 3/50* (2013.01); *H04M 2203/152* (2013.01)
(58) Field of Classification Search
None
See application file for complete search history.

(56) References Cited

U.S. PATENT DOCUMENTS

| | | | |
|---|---|---|---|
| 7,260,191 B1 * | 8/2007 | Laurinavichus | H04M 3/5166 715/744 |
| 2003/0176163 A1 * | 9/2003 | Gosewehr | H04W 24/00 455/3.04 |
| 2008/0091837 A1 * | 4/2008 | Langen | H04L 67/1014 709/230 |

* cited by examiner

*Primary Examiner* — Hemant S Patel
(74) *Attorney, Agent, or Firm* — Schwegman, Lundberg & Woessner, P.A.

(57) ABSTRACT

In an example embodiment, a solution is provided that provides multiple call control service instances for each media server instance. When one of the call control service instances needs to be updated, the media server is instructed to direct newly received voice calls to another of the call control instances. The call control service instance to be updated remains operating normally until all voice calls handled by that call control service instance have ended naturally, but any new calls received during that time are directed to one of the other call control service instances. Only once all the voice calls handled by the call control service instance to be updated have ended is that call control service instance actually updated, without having had to disconnect a live call.

14 Claims, 5 Drawing Sheets

CALL CONTROL INSTANCE CHANGEOVER

TECHNICAL FIELD

This application relates generally to voice communications. More specifically, this application relates to changeover of call control instances.

BACKGROUND

It is common now for many voice communications to be handled by media servers, namely computer systems operating at some voice communication data center. Indeed, some voice service provider data centers are considered to be managed service provider data centers, as they also act to manage the voice communication service.

Typically such managed service provider data centers will maintain a media server, implemented as an instance of media server software operating on a computer device. They also will maintain a call control service (CCS), implemented as an instance of the CCS operating on a computer device (often the same device as the media server). The purpose of the CCS is to provide various levels of control of phone calls, including coordinating access to Interactive Voice Response (IVR), managing live agents handling incoming phone calls (including scheduling the agents), transferring calls, etc.

A technical issue arises, however, when it is necessary to update the CCS software. Typically the instance of the CCS is taken offline to perform the update (typically a patch), and then brought back online once the update is complete. Since the CCS software manages calls already in progress, taking the CCS offline to perform an update would disconnect any call currently being managed by the instance of the CCS. The current way of handling this problem is to schedule maintenance windows, essentially periods of time where customers know that CCS functionality will be taken offline so as to inform the customers to avoid voice calls during that time. This can be difficult to schedule, however, especially in business environments that operate 24 hours a day, 7 days a week (e.g., manage voice calls from all over the world). Additionally, some calls last for an extended period of time (hundreds of hours) and are difficult to reschedule.

What is needed is a technical solution that allows a CCS instance to be updated without disconnecting voice calls in progress or scheduling a maintenance window.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and machine-readable media (e.g., computing machine program products) that embody illustrative embodiments. In the following description, for purposes of explanation, numerous specific details are set forth in order to provide an understanding of various embodiments of the inventive subject matter, It will be evident, however, to those skilled in the art that embodiments of the inventive subject matter may be practiced without these specific details. In general, well-known instruction instances, protocols, structures, and techniques have not been shown in detail.

In an example embodiment, a solution is provided that provides multiple call control service instances for each media server instance. When one of the call control service instances needs to be updated, the media server is instructed to direct newly received voice calls to another of the call control instances. The call control service instance to be updated remains operating normally until all voice calls handled by that call control service instance have ended naturally, but any new calls received during that time are directed to one of the other call control service instances. Only once all the voice calls handled by the call control service instance to be updated have ended is that call control service instance actually updated, without having had to disconnect a live call.

More particularly, when it is determined that a first call control instance needs to be updated, call control software modifies a dial plan maintained by the corresponding media server instance. The dial plan is a file that indicates where new voice calls should be directed, and usually will utilize some sort of load balancing process to determine which call control instance to direct an incoming new voice call to, assuming there are multiple call control instances. Here, this dial plan will be modified to remove the first call control instance from that dial plan, until such time that the first call control instance has been updated. In some example embodiments, the dial plan is also modified to add a second call control instance to the dial plan, with that second call control instance being used for new calls until the dial plan is modified again to send new calls back to the first call control instance (such as after the first call control instance has been updated).

In an example embodiment, each media server instance is assigned two groups of call control instance(s): an active group and a standby group. Each group contains one or more call control instances. In. one example embodiment, each group contains three call control instances, making a total of six call control instances assigned to each media server instance. It should be noted that a media server may itself run multiple media server instances for redundancy, and each of these media server instances may be assigned six call control instances.

For the active and standby groups, the active group contains call control instance(s) that are currently in use, meaning they are available to receive and handle phone calls, and to whom the corresponding media server instance considers sending incoming phone call information (e.g., the dialplan of the corresponding media server instance lists the call control instances in the active group as being part of the group of call control instances the corresponding load balancing process selects from). The standby group contains call control instance(s) that are not currently in use, meaning that the corresponding media server does not consider sending them incoming phone call information (e.g., the dialplan of the corresponding media server instance does not list the call control instances in the standby group as being part of the group of call control instances the corresponding load balancing process selected from).

Each CCS instance may provide one or more call control functions, such as call queues, smart routing (sending calls to the right agents), analytics and reporting, live chat, agent scheduling and quality assurance, IVR, and/or administration. IVR is an automated phone system technology that allows callers to access information via a voice response system of recorded messages without having to speak to a live agent, as well as to utilize menu options via touchtone keypad selection or speech recognition to have their call routed to specific departments.

In a further example embodiment, a solution is provided that decouples the call control service instances from the voice media server, which allows the voice media server to be geographically placed in a location most beneficial to keep digital voice file transmission to a minimum (thus saving bandwidth), while allowing the CCS component to he geographically located anywhere without negatively impacting the bandwidth usage. An additional benefit is that by decoupling the CCS component from the voice media server, the CCS can be implemented in a way that lets it work with multiple redundant voice media servers simultaneously, allowing one of the voice media servers to become unavailable without impacting service.

Figure 1:
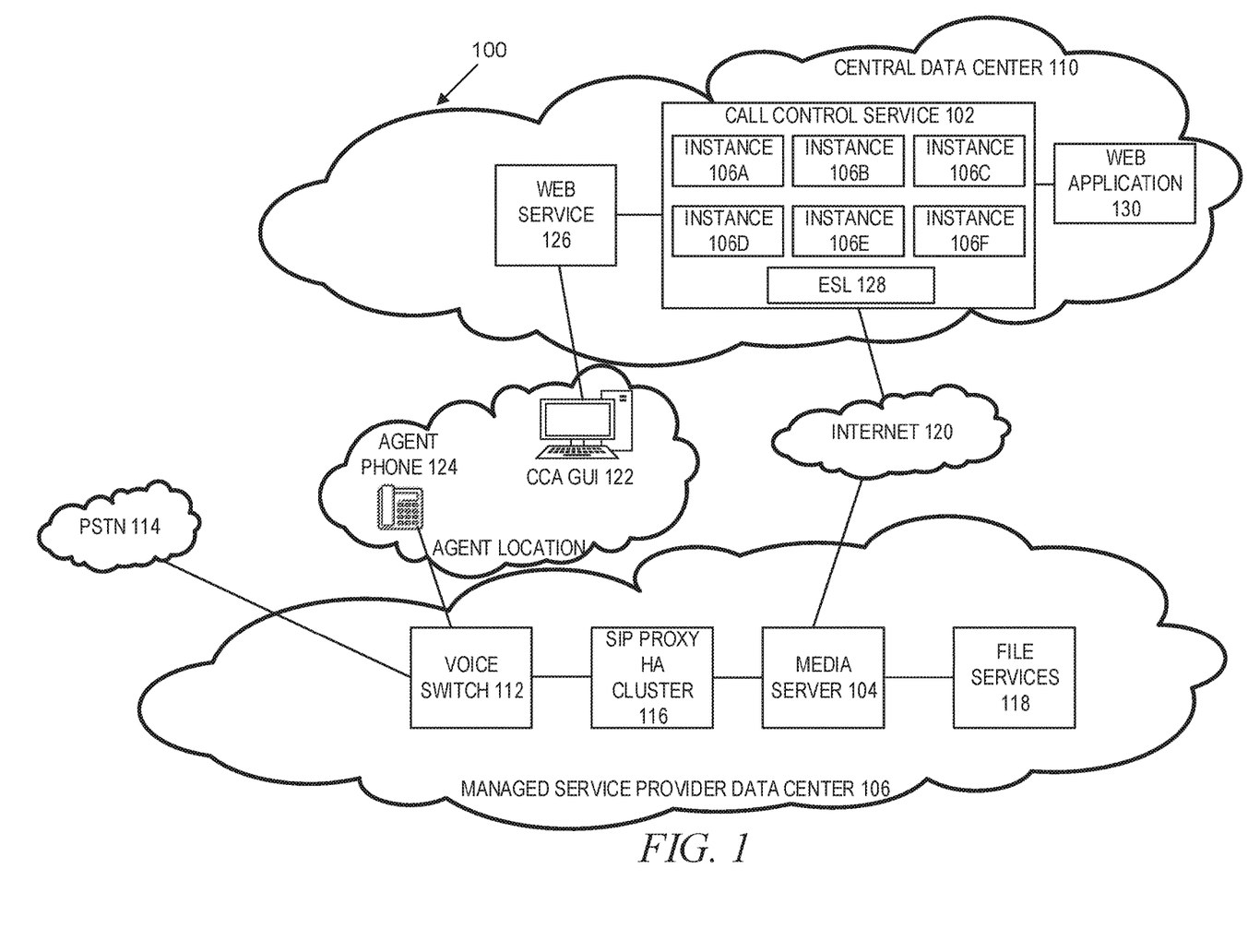
FIG. 1 is a block diagram illustrating a system for call control service instance switchover in accordance with an example embodiment.

FIG. 1 is a block diagram illustrating a system 100 for call control service instance switchover in accordance with an example embodiment. Here, rather than integrate a CCS 102 within a media server 104 at a managed service provider data center 106, the CCS 102 is located at a geographically remote central data center 110.

More particularly, the managed service provider data center 106 includes a voice switch 112 that connects to a public switched telephone network (PSTN) 114. Calls are received at the voice switch 112 from the PSTN 114 and sent to the media server 104. In some example embodiments, calls are also sent to a Session Initiation Protocol (SIP) Proxy high availability cluster 116. The SIP Proxy high availability cluster 116 controls what may be multiple instances of the media server 104, for redundancy purposes (which may include automatic failover, which means that if one instance of the media server 104 goes down, another can take over without human intervention and without loss of service). More particularly, command and control for media servers may be replicated across singular or multiple communication service provider deployments. Additional file services 118, such as retrieval of stored calls, may also be provided from the managed service provider data center 106.

The CCS instances 106A, 106B, 106C, 106D, 106E, 106F may manage events to or from a call control service anywhere graphical user interface (CCA GUI) 122, which may be connected to an agent phone 124 that a human agent uses during a call to speak with the user. Communication between the CCS 102 and the CCA GUI 122 may be handled via a web service 126.

In an example embodiment, an Event Socket Layer (ESL) 128 is used to communicate between the CCS 102 and the media server 104 More particularly, the ESL 128 may implement calls to an event socket on the media server 104, which implements an event socket library containing various functions that can be activated by the calls. Example functions include setting a log level (which issues informative messages related to the ESL 128), instantiating a new event object, and initializing a new instance of an ESL connection.

The media server 104 (which may include multiple instances of the media server in redundant configurations) may then connect remotely with the CCS 102 at the central data center 110, via the Internet 120. In an example embodiment, this connection may be via an IP Security (IPSec) Virtual Private Network (VPN) tunnel.

The CCS 102 may maintain multiple CCS instances for each media server 104 instance. Here, there are six CCS instances 106A, 106B, 106C, 106D, 106E, and 106F. These may be grouped into an active group and a standby group. For example, CCS instances 106A, 106B, and 106C may initially be grouped into the active group and CCS instances 106D, 106E, and 106F may be grouped into the standby group.

Each instance 106 of the media server 104 may maintain a dialplan, which indicates how to route a dialed call to an endpoint based on the extension and its condition. When a matching extension is found, it executes its action. In an example embodiment, the dialplan is an Extensible Markup Language (XML) document, or at least contains information to retrieve an XML document from a repository.

When an administrator decides that the instances in the active group (such as instances 106A, 106B, and 106C) should be updated, the dialplan is modified to remove references to those instances and instead add in references to the instances in the standby group (such as instances 106D, 106E, and 106F). This effectively reroutes call control communications regarding new calls received by the media server 104 from the instances in the active group to the instances in the standby group, and makes the latter instances now the active group. Notably, however, the instances in the earlier active group (namely instances 106A, 106B, and 106C) remain active at least for calls currently in progress. Since, however, they are not routing call control communications regarding new calls received by the media server 104, eventually there will be no more calls currently in progress. At that point, instances 106A, 106B, 106C may safely be updated as doing so will not cause the disconnect of any voice calls.

It should be noted that the group for instances 106A, 106B, 106C may change to the standby group when the dialplan is updated, but this does not imply that these instances are deactivated, just that they are no longer active for new calls to be assigned.

In an example embodiment, the media server 104 may actually be a full-service media server 104, which has the capability to provide call control services such as IVR services using an integrated component, but whose call control services have been disabled or otherwise are not utilized. In this manner, an existing media server 104 may be repurposed for use with a decoupled CCS 102 without needing to completely redesign the media server 104.

In the embodiment of FIG. 1, voice media does not flow back to the central data center 110, thus not introducing quality degrading "hops" to the voice calls, while the voice real-time-processing stays local to the service provider network, including the managed service provider data center 106.

Figure 2:
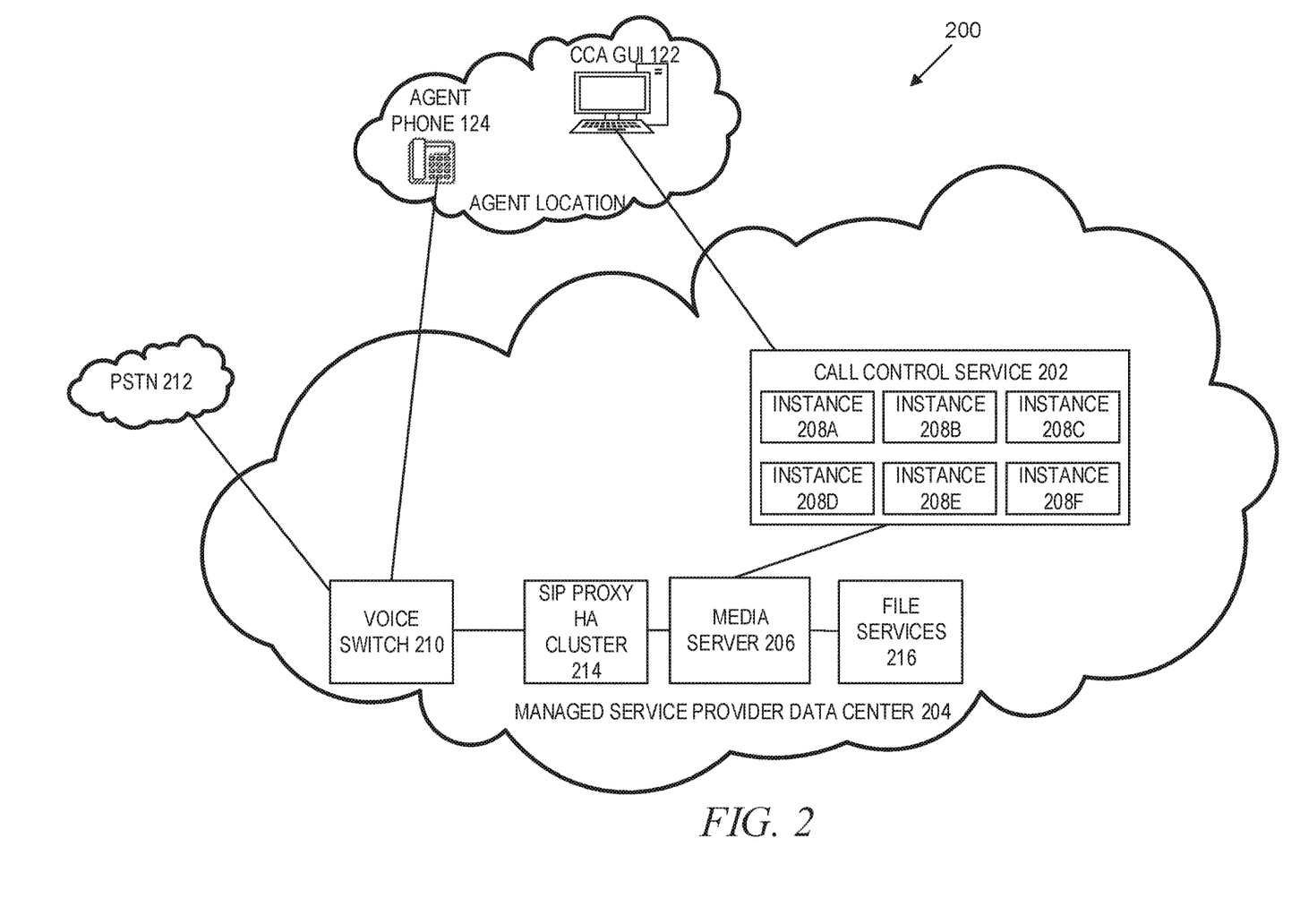
FIG. 2 is a block diagram illustrating a system for call control service instance switchover in accordance with another example embodiment.

FIG. 2 is a block diagram illustrating a system 200 for call control service instance switchover in accordance with another example embodiment. Here, the CCS 202 is integrated within the managed service provider data center 204, although it is still separate from a media server 206 at the managed service provider data center 204.

More particularly, the managed service provider data center 204 includes a voice switch 210 that connects to a public switched telephone network (PSTN) 212. Calls are received at the voice switch 210 from the PSTN 212 and sent to the media server 206. In some example embodiments, calls are also sent to a Session Initiation Protocol (SIP) Proxy high availability cluster 214. The SIP Proxy high availability cluster 214 controls what may be multiple instances of the media server 206, for redundancy purposes (which may include automatic failover, which means that if one instance of the media server 206 goes down, another can take over without human intervention and without loss of service). More particularly, command and control for media servers may be replicated across singular or multiple communication service provider deployments. Additional file services 216, such as retrieval of stored calls, may also be provided from the managed service provider data center 204.

The media server 206 (which may include multiple instances of the media server in redundant configurations) may then connect directly with the CCS 202.

The CCS 202 may maintain multiple CCS instances for each media server 206 instance. Here, there are six CCS instances 208A, 208B, 208C, 208D, 208E, and 208F. These may be grouped into an active group and a standby group, and operate the same way as instances 106A, 106B, 106C, 106D, 106E, and 106F, including interactions with the media server 206 instance in the same way as earlier described, with respect to FIG. 1.

Figure 3:
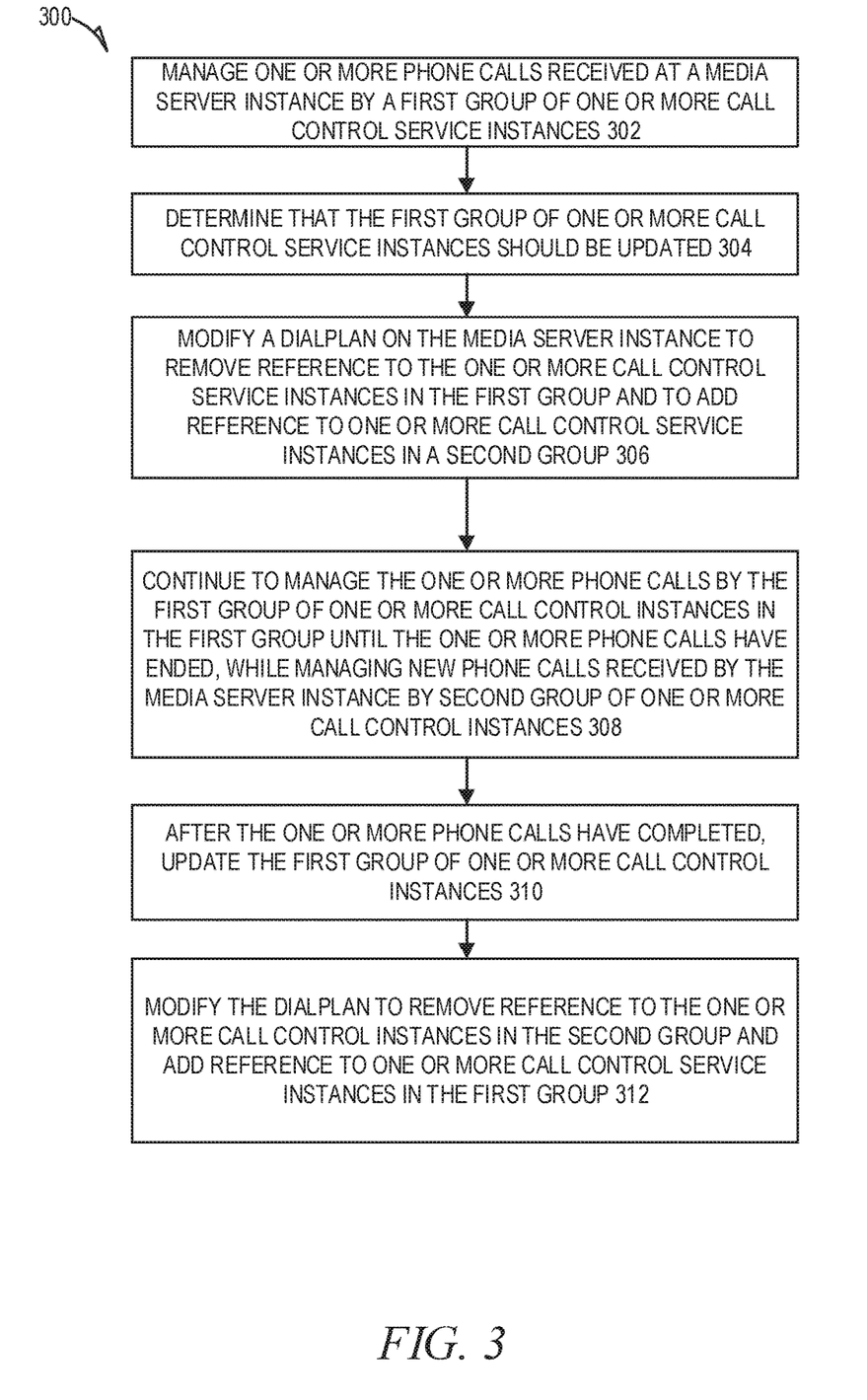
FIG. 3 is a flow diagram illustrating a method for managing a media server, in accordance with an example embodiment.

FIG. 3 is a flow diagram illustrating a method 300 for managing a media server, in accordance with an example embodiment. At operation 302, one or more phone calls received at a media server instance are managed by a first group of one or more call control service instances, the managing not including receiving voice data from the media server instance. At operation 304, it is determined that the one or more call control service instances in the first group should be updated. This updating may require disconnecting any active calls being managed by the one or more call control service instances in the first group, if the update is performed while these active calls are not yet complete.

At operation 306, a dialplan on the media server instance is modified to remove reference to the one or more call control service instances in the first group and to add reference to one or more call control service instances in a second group. At operation 308, the one or more phone calls are continued to be managed by the first group of one or more call control service instances until the one or more phone calls have completed, while managing, by the second group of one or more call control service instances, new phone calls received by the media server instance after the modifying. At operation 310, after the one or more phone calls managed by the first group of one or more call control service instances have completed, the first group of one or more call control service instances is updated. At operation 312, after the updating, the dialplan is modified to remove reference to the one or more call control service instances in the second group and to add reference to one or more call control service instances in a first group.

Figure 4:
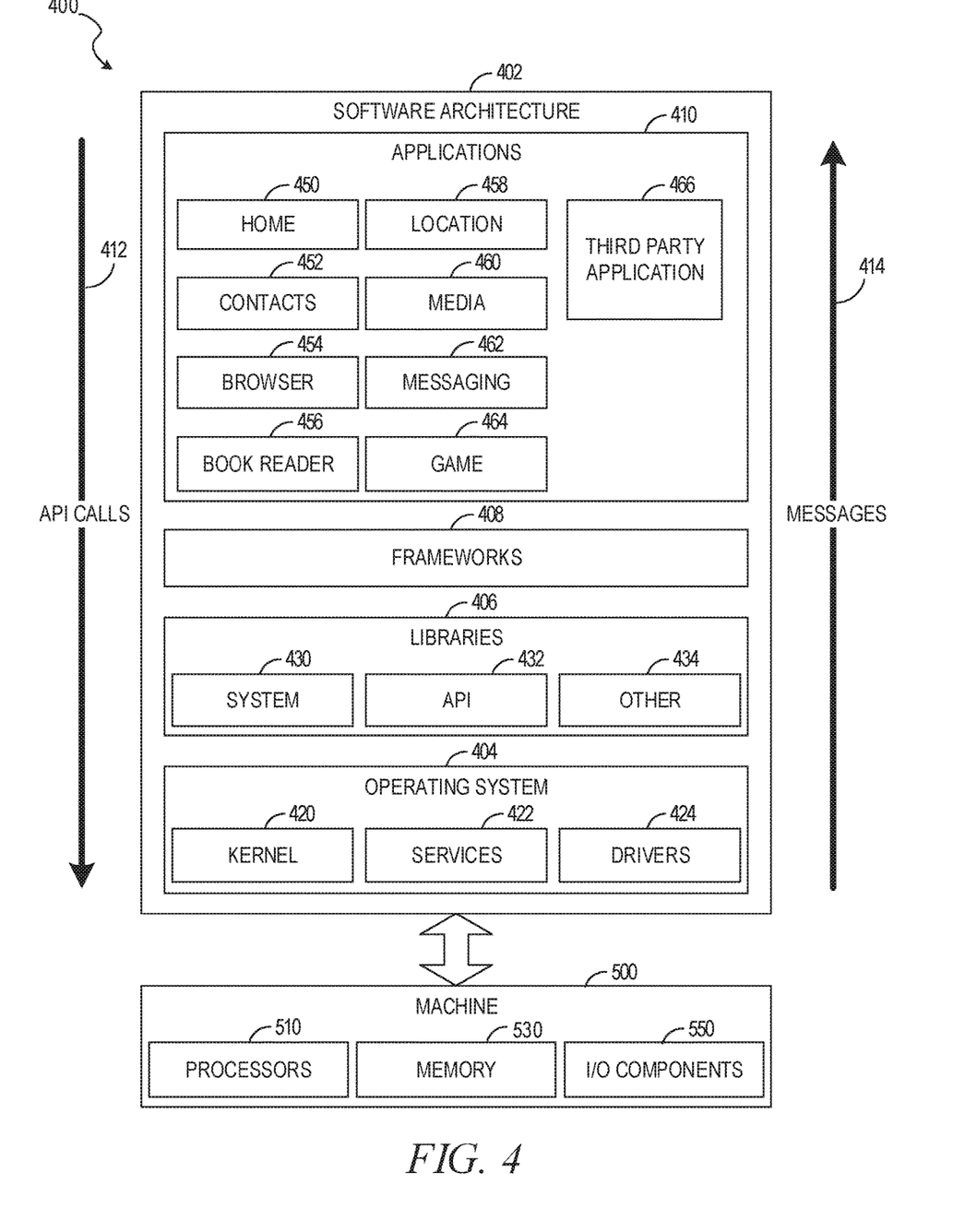
FIG. 4 is a block diagram illustrating a software architecture, which can be installed on any one or more of the devices described above.

FIG. 4 is a block diagram 400 illustrating a software architecture 402, which can be installed on any one or more of the devices described above. FIG. 4 is merely a non-limiting, example of a software architecture, and it will be appreciated that many other architectures can be implemented to facilitate the functionality described herein. In various embodiments, the software architecture 402 is implemented by hardware such as a machine 500 of FIG. 5 that includes processors 510, memory 530, and input/output (I/O) components 550. In this example architecture, the software architecture 402 can be conceptualized as a stack of layers where each layer may provide a particular functionality. For example, the software architecture 402 includes layers such as an operating system 404, libraries 406, frameworks 408, and applications 410. Operationally, the applications 410 invoke API calls 412 through the software stack and receive messages 414 in response to the API calls 412, consistent with some embodiments.

In various implementations, the operating system 404 manages hardware resources and provides common services. The operating system 404 includes, for example, a kernel 420, services 422, and drivers 424. The kernel 420 acts as an abstraction layer between the hardware and the other software layers, consistent with some embodiments. For example, the kernel 420 provides memory management, processor management (e.g., scheduling), component management, networking, and security settings, among other functionality. The services 422 can provide other common services for the other software layers. The drivers 424 are responsible for controlling or interfacing with the underlying hardware, according to some embodiments. For instance, the drivers 424 can include display drivers, camera drivers, Bluetooth® or Bluetooth® Low Energy drivers, flash memory drivers, serial communication drivers (e.g., Universal Serial Bus (USB) drivers), Wi-Fi® drivers, audio drivers, power management drivers, and so forth.

In some embodiments, the libraries 406 provide a low-level common infrastructure utilized by the applications 410. The libraries 406 can include system libraries 430 (e.g., C standard library) that can provide functions such as memory allocation functions, string manipulation functions, mathematic functions, and the like. In addition, the libraries 406 can include API libraries 432 such as media libraries (e.g., libraries to support presentation and manipulation of various media formats such as Moving Picture Experts Group-4(MPEG4), Advanced Video Coding (H.264 or AVC), Moving Picture Experts Group Layer-3(MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 406 can also include a wide variety of other libraries 434 to provide many other APIs to the applications 410.

The frameworks 408 provide a high-level common infrastructure that can be utilized by the applications 410, according to some embodiments. For example, the frameworks 408 provide various GUI functions, high-level resource management, high-level location services, and so forth. The frameworks 408 can provide a broad spectrum of other APIs that can be utilized by the applications 410, some of which may be specific to a particular operating system 404 or platform.

In an example embodiment, the applications 410 include a home application 450, a contacts application 452, a browser application 454, a book reader application 456, a location application 458, a media application 460, a messaging application 462, a game application 464, and a broad assortment of other applications, such as a third-party application 466. According to some embodiments, the applications 410 are programs that execute functions defined in the programs. Various programming languages can be employed to create one or more of the applications 410, structured in a variety of manners, such as object-oriented programming languages (e.g., Objective-C, Java, or C++) or procedural programming languages (e.g., C or assembly language). In a specific example, the third-party application 466 (e.g., an application developed using the Android™ or iOS™ software development kit (SDK) by an entity other than the vendor of the particular platform) may be mobile software running on a mobile operating system such as iOS™, Android™, Windows® Phone, or another mobile operating system. In this example, the third-party application 466 can invoke the API calls 412 provided by the operating system 404 to facilitate functionality described herein.

Figure 5:
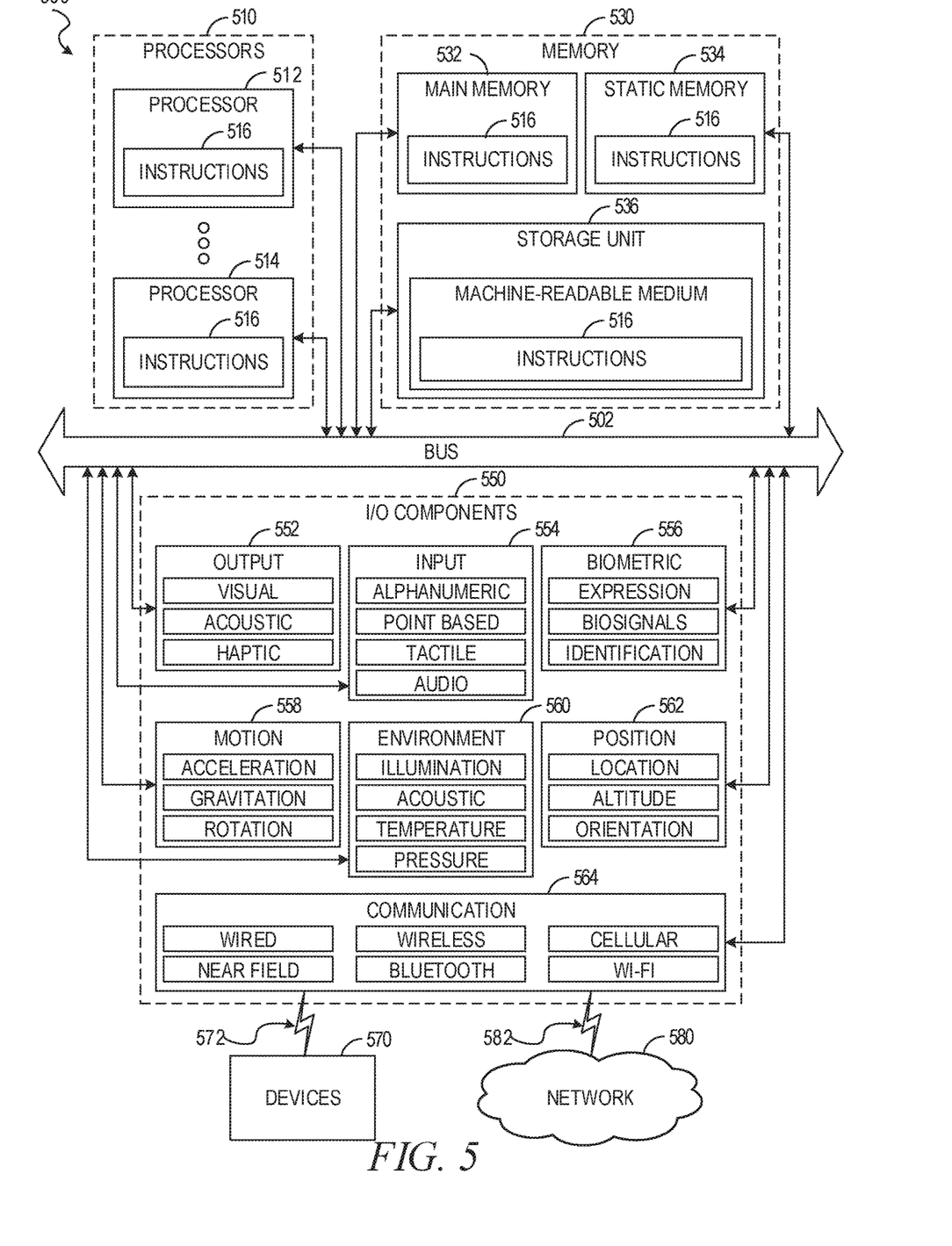
FIG. 5 illustrates a diagrammatic representation of a machine in the form of a computer system within which a set of instructions may be executed for causing the machine to perform any one or more of the methodologies discussed herein, according to an example embodiment.

FIG. 5 illustrates a diagrammatic representation of a machine 500 in the form of a computer system within which a set of instructions may be executed for causing the machine 500 to perform any one or more of the methodologies discussed herein, according to an example embodiment. Specifically, FIG. 5 shows a diagrammatic representation of the machine 500 in the example form of a computer system, within which instructions 516 (e.g., software, a program, an application 410, an applet, an app, or other executable code) for causing the machine 500 to perform any one or more of the methodologies discussed herein may be executed. example, the instructions 516 may cause the machine 500 to execute the method 300 of FIG. 3. Additionally, or alternatively, the instructions 516 may implement FIGS. 1-3, and so forth. The instructions 516 transform the general, non-programmed machine 500 into a particular machine 500 programmed to carry out the described and illustrated functions in the manner described, In alternative embodiments, the machine 500 operates as a standalone device or may be coupled (e.g., networked) to other machines. in a networked deployment, the machine 500 may operate in the capacity of a server machine or a client machine in a server-client network environment, or as a peer machine in a peer-to-peer (or distributed) network environment. The machine 500 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 516, sequentially or otherwise, that specify actions to be taken by the machine 500. Further, while only a single machine 500 is illustrated, the term "machine" shall also be taken to include a collection of machines 500 that individually or jointly execute the instructions 516 to perform any one or more of the methodologies discussed herein.

The machine 500 may include processors 510, memory 530, and I/O components 550, which may be configured to communicate with each other such as via a bus 502. In an example embodiment, the processors 510 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 512 and a processor 514 that may execute the instructions 516. The term "processor" is intended to include multi-core processors 510 that may comprise two or more independent processors 512, 514 (sometimes referred to as "cores") that may execute instructions 516 contemporaneously. Although FIG. 5 shows multiple processors 510, the machine 500 may include a single processor 512 with a single core, a single processor 512 with multiple cores (e.g., a multi-core processor), multiple processors 510 with a single core, multiple processors 510 with multiple cores, or any combination thereof.

The memory 530 may include a main memory 532, a static memory 534, and a storage unit 536, all accessible to the processors 510 such as via the bus 502. The main memory 532, the static memory 534, and the storage unit 536 store the instructions 516 embodying any one or more of the methodologies or functions described herein. The instructions 516 may also reside, completely or partially, within the main memory 532, within the static memory 534, within the storage unit 536, within at least one of the processors 510 (e.g., within the processor's cache memory), or any suitable combination thereof, during execution thereof by the machine 500.

The I/O components 550 may include a wide variety of components to receive input, provide output, produce output, transmit information, exchange information, capture measurements, and so on. The specific I/O components 550 that are included in a particular machine 500 will depend on the type of machine 500. For example, portable machines such as mobile phones will likely include a touch input device or other such input mechanisms, while a headless server machine will likely not include such a touch input device. It will be appreciated that the I/O components 550 may include many other components that are not shown in FIG. 5. The I/O components 550 are grouped according to functionality merely for simplifying the following discussion, and the grouping is in no way limiting. In various example embodiments, the I/O components 550 may include output components 552 and input components 554. The output components 552 may include visual components (e.g., a display such as a plasma display panel (PDP), a light-emitting diode (LED) display, a liquid crystal display (LCD), a projector, or a cathode ray tube (CRT)), acoustic components speakers), haptic components (e.g., a vibratory motor, resistance mechanisms), other signal generators, and so forth. The input components 554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 550 may include biometric components 556, motion components 558, environmental components 560, or position components 562, among a wide array of other components. For example, the biometric components 556 may include components to detect expressions (e.g., hand expressions, facial expressions, vocal expressions, body gestures, or eye tracking), measure biosignals (e.g., blood pressure, heart rate, body temperature, perspiration, or brain waves), identify a person voice identification, retinal identification, facial identification, fingerprint identification, or electroencephalogram-based identification), and the like. The motion components 558 may include acceleration sensor components (e.g., accelerometer), gravitation sensor components, rotation sensor components (e.g., gyroscope), and so forth. The environmental components 560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 562 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies, The I/O components 550 may include communication components 564 operable to couple the machine 500 to a network 580 or devices 570 via a coupling 582 and a coupling 572, respectively. For example, the communication components 564 may include a network interface component or another suitable device to interface with the network 580. In further examples, the communication components 564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 570 may be another machine or any of a wide variety of peripheral devices (e.g., a peripheral device coupled via a USB).

Moreover, the communication components 564 may detect identifiers or include components operable to detect identifiers. For example, the communication components 564 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 564, such as location via Internet Protocol (IP) geolocation, location via Wi-Fi® signal triangulation, location via detecting an NFC beacon signal that may indicate a particular location, and so forth.

Executable Instructions and Machine-Storage Medium

The various memories (i.e., 530, 532, 534, and/or memory of the processor(s) 510) and/or the storage unit 536 may store one or more sets of instructions 516 and data structures (e.g., software) embodying or utilized by any one or more of the methodologies or functions described herein. These instructions (e.g., the instructions 516), when executed by the processor(s) 510, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 516 and/or data. The terms shall accordingly be taken to include, but not be limited to, solid-state memories, and optical and magnetic media, including memory internal or external to the processors 510. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 580 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 580 or a portion of the network 580 may include a wireless or cellular network, and the coupling 582 may be a Code Division Multiple Access (CDMA) connection, a Global System for Mobile communications (GSM) connection, or another type of cellular or wireless coupling. In this example, the coupling 582 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 516 may be transmitted or received over the network 580 using a transmission medium via a network interface device (e.g., a network interface component included in the communication components 564) and utilizing any one of a number of well-known transfer protocols (e.g., HTTP). Similarly, the instructions 516 may be transmitted or received using a transmission medium via the coupling 572 (e.g., a peer-to-peer coupling) to the devices 570. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 516 for execution by the machine 500, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:
a media server comprising one or more media server instances, each media server instance configured to receive phone calls from callers, store voice data of the phone calls, and transmit the voice data between the callers and other participants of the phone call; and
a call control service containing, for each of the one or more media server instances, a first group of one or more call control service instances and a second group of one or more call control service instances, each call control instance in the first group configured to manage the phone calls received at a corresponding media server instance without the call control instance receiving any voice data, the first group being an active group and the second group being a standby group, the one or more call control instances in the first group being referenced in a dialplan stored on the corresponding media server instance, each call control service instance in the first group and each call control service instance in the second group located at a different geographical location than the corresponding media server instance;
wherein the call control service is configured to:
modify the dialplan to no longer reference the one or more call control instances in the first group and instead reference the one or more call control instances in the second group;
wait until after any existing phone calls being managed by the one or more call control instances in the first group have completed and then deactivate the one or more call control instances in the first group while the one or more call control instances in the first group are updated; and
after the one or more call control instances in the first group are updated, modify the dialplan to no longer reference the one or more call control instances in the second group and instead reference the one or more call control instances in the first group.

2. The system of claim 1, wherein the corresponding media server instance is connected to a managed service provider data center that further comprises a voice switch that connects to a public switched telephone network (PSTN).

3. The system of claim 2, wherein calls received via the PSTN are sent to a Session Initiation Protocol (SIP) high availability cluster that controls multiple instances of the media server.

4. The system of claim 1, wherein the call control service is located at a central data center and the media server is located at a managed service provider data center.

5. The system of claim 1, wherein the call control service communicates with the media server via an Event Service Layer (ESL).

6. A method comprising:
managing, by a first group of one or more call control service instances, one or more phone calls received at media server instance, the managing not including receiving voice data from the media server instance;
determining that the one or more call control service instances in the first group should be updated;
modifying a dialplan on the media server instance to remove reference to the one or more call control service instances in the first group and to add reference to one or more call control service instances in a second group;
continuing to manage the one or more phone calls by the first group of one or more call control service instances until the one or more phone calls have completed, while managing, by the second group of one or more call control service instances, new phone calls received by the media server instance after the modifying;
after the one or more phone calls managed by the first group of one or more call control service instances have completed, updating the first group of one or more call control service instances;
after the updating, modifying the dialplan to remove reference to the one or more call control service instances in the second group and to add reference to one or more call control service instances in the first group; and
each call control service instance in the first group and each call control service instance in the second group being located at a different geographical location than the media server instance.

7. The method of claim 6, wherein the media server instance is connected to a managed service provider data center that further comprises a voice switch that connects to a public switched telephone network (PSTN).

8. The method of claim 7, wherein calls received via the PSTN are sent to a Session Initiation Protocol (SIP) high availability cluster that controls multiple instances of the media server.

9. The method of claim 6, wherein the first group of one or more call control service instances and the second group of one or more call control service instances are located at a central data center and the media server instance is located at a managed service provider data center.

10. The method of claim 6, wherein the call control service instance communicates with the media server via an Event Service Layer (ESL), further comprising:
pushing one or more interactive voice response (IVR) scripts to the media server;
receiving, from the media server, one or more events occurring during execution of the one or more IVR scripts, without receiving any voice media from the media server; and
using the one or more events to perform one or more call control activities on a phone call that corresponds to the one or more events.

11. A non-transitory machine-readable storage medium comprising instructions, which when implemented by one or more machines, cause the one or more machines to perform operations comprising:
managing, by a first group of one or more call control service instances, one or more phone calls received at media server instance, the managing not including receiving voice data from the media server instance;
determining that the one or more call control service instances in the first group should be updated;

modifying a dialplan on the media server instance to remove reference to the one or more call control service instances in the first group and to add reference to one or more call control service instances in a second group;

continuing to manage the one or more phone calls by the first group of one or more call control service instances until the one or more phone calls have completed, while managing, by the second group of one or more call control service instances, new phone calls received by the media server instance after the modifying;

after the one or more phone calls managed by the first group of one or more call control service instances have completed, updating the first group of one or more call control service instances;

after the updating, modifying the dialplan to remove reference to the one or more call control service instances in the second group and to add reference to one or more call control service instances in the first group; and each call control service instance in the first group and each call control service instance in the second group being located at a different geographical location than the media server instance.

12. The non-transitory machine-readable storage medium of claim 11, wherein the media server instance is connected to a managed service provider data center that further comprises a voice switch that connects to a public switched telephone network (PSTN).

13. The non-transitory machine-readable storage medium of claim 12, wherein calls received via the PSTN are sent to a Session Initiation Protocol (SIP) high availability cluster that controls multiple instances of the media server.

14. The non-transitory machine-readable storage medium of claim 11, wherein the first group of one or more call control service instances and the second group of one or more call control service instances are located at a central data center and the media server instance is located at a managed service provider data center.

* * * * *